US012722117B2

(12) United States Patent
Sakano et al.

(10) Patent No.: US 12,722,117 B2
(45) Date of Patent: Sep. 1, 2026

(54) ADSORPTION SYSTEM AND ADSORPTION METHOD

(71) Applicant: TOYOTA JIDOSHA KABUSHIKI KAISHA, Toyota (JP)

(72) Inventors: Mitsuru Sakano, Toyota (JP); Masaki Watanabe, Sunto-gun (JP); Satsuki Osada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 18/624,494

(22) Filed: Apr. 2, 2024

(65) Prior Publication Data

US 2024/0390843 A1 Nov. 28, 2024

(30) Foreign Application Priority Data

May 26, 2023 (JP) ................................ 2023-086803

(51) Int. Cl.
*B01D 53/02* (2006.01)
*B01D 53/30* (2006.01)

(52) U.S. Cl.
CPC ............ *B01D 53/30* (2013.01); *B01D 53/02* (2013.01); *B01D 2257/504* (2013.01)

(58) Field of Classification Search
CPC ............. B01D 2257/504; B01D 53/02; B01D 53/0454; B01D 53/30; Y02C 20/40
See application file for complete search history.

(56) References Cited

U.S. PATENT DOCUMENTS

| | | | | |
|---|---|---|---|---|
| 5,288,311 | A * | 2/1994 | Furutani | A61H 33/60 96/132 |
| 10,684,027 | B2 * | 6/2020 | Goswami | F24F 8/80 |
| 2011/0083458 | A1 * | 4/2011 | Takakura | F24F 11/30 62/176.1 |
| 2019/0160418 | A1 | 5/2019 | Matsumoto et al. | |
| 2022/0134307 | A1 | 5/2022 | Sadiq et al. | |
| 2023/0381709 | A1 | 11/2023 | Maeda et al. | |
| 2025/0296039 | A1 * | 9/2025 | Ikutomo | B01D 53/346 |

FOREIGN PATENT DOCUMENTS

| | | | |
|---|---|---|---|
| CN | 115417408 | A | 12/2022 |
| JP | S62-225244 | A | 10/1987 |
| JP | 2019-098874 | A | 6/2019 |
| JP | 2022-141134 | A | 9/2022 |

* cited by examiner

*Primary Examiner* — Christopher P Jones
(74) *Attorney, Agent, or Firm* — Oliff PLC

(57) ABSTRACT

An adsorption system according to one aspect of the present disclosure is an adsorption system which adsorbs, from a gas containing a predetermined gas component to be adsorbed and water vapor, the predetermined gas component. The adsorption system includes: an adsorption part configured to adsorb the predetermined gas component from the gas; a measurement unit configured to measure a humidity of the gas; and a flow rate controller configured to control a flow rate of the gas supplied to the adsorption part based on the humidity measured by the measurement unit.

2 Claims, 3 Drawing Sheets

ADSORPTION SYSTEM AND ADSORPTION METHOD

CROSS REFERENCE TO RELATED APPLICATIONS

This application is based upon and claims the benefit of priority from Japanese patent application No. 2023-086803, filed on May 26, 2023, the disclosure of which is incorporated herein in its entirety by reference.

BACKGROUND

The present disclosure relates to an adsorption system and an adsorption method.

Japanese Unexamined Patent Application Publication No. 2019-98874 discloses an air purification device for a vehicle that uses an adsorbent material to adsorb carbon dioxide and water vapor in a vehicle. The air purification device for the vehicle disclosed in Japanese Unexamined Patent Application Publication No. 2019-98874 measures concentrations of carbon dioxide and water vapor in the vehicle and estimates whether the adsorbent material is saturated based on the measured concentrations. The air purification device for the vehicle disclosed in Japanese Unexamined Patent Application Publication No. 2019-98874 releases carbon dioxide and water vapor from the adsorbent material when it is estimated that the adsorption state of the adsorbent material is saturated.

SUMMARY

As disclosed in Japanese Unexamined Patent Application Publication No. 2019-98874, an adsorbent material that adsorbs a predetermined gas component, such as carbon dioxide, adsorbs not only the predetermined gas component but also water vapor in the gas. When the adsorbent material adsorbs water vapor, the amount of gas other than water vapor that the adsorbent material can adsorb decreases. Therefore, there is a problem that, in the case where water vapor is not to be adsorbed, when the humidity in the gas is high, the efficiency of adsorbing a predetermined gas component to be adsorbed becomes low.

That is, in the technology according to related art, there is a problem that the efficiency of adsorbing a gas component to be adsorbed cannot be sufficiently improved when the humidity of the gas is high. Japanese Unexamined Patent Application Publication No. 2019-98874 does not disclose any technique that can solve the aforementioned problem.

The present disclosure has been made to solve the aforementioned problem, and an object of the present disclosure is to provide an adsorption system and an adsorption method that can improve the efficiency of adsorbing a gas component.

An adsorption system according to one aspect of the present disclosure is an adsorption system which adsorbs, from a gas containing a predetermined gas component to be adsorbed and water vapor, the predetermined gas component, the adsorption system including: an adsorption part configured to adsorb the predetermined gas component from the gas; a measurement unit configured to measure a humidity of the gas; and a flow rate controller configured to control a flow rate of the gas supplied to the adsorption part based on the humidity measured by the measurement unit.

According to the aforementioned configuration, the adsorption system according to one aspect of the present disclosure can adjust the ability to adsorb a predetermined gas component and water vapor. As a result, the adsorption system according to one aspect of the present disclosure can improve the efficiency of adsorbing the gas component.

The adsorption system according to one aspect of the present disclosure may determine the flow rate of the gas to be a first flow rate when the humidity measured by the measurement unit is less than a predetermined threshold, and determine the flow rate of the gas to be a second flow rate higher than the first flow rate when the humidity measured by the measurement unit is greater than the predetermined threshold. According to the aforementioned configuration, the adsorption system according to one aspect of the present disclosure can reduce the cost for adsorbing the gas component.

The adsorption system according to one aspect of the present disclosure is particularly effective when the gas is an atmosphere and the predetermined gas component is carbon dioxide.

An adsorption method according to one aspect of the present disclosure is an adsorption method for adsorbing, from a gas containing a predetermined gas component to be adsorbed and water vapor, the predetermined gas component, the adsorption method including: measuring a humidity of the gas; and controlling a flow rate of the gas supplied to an adsorption part which adsorbs the predetermined gas component from the gas based on the measured humidity.

According to the present disclosure, it is possible to provide an adsorption system and an adsorption method capable of improving the efficiency of adsorbing a gas component.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

<Configuration of Adsorption System>

Figure 1:
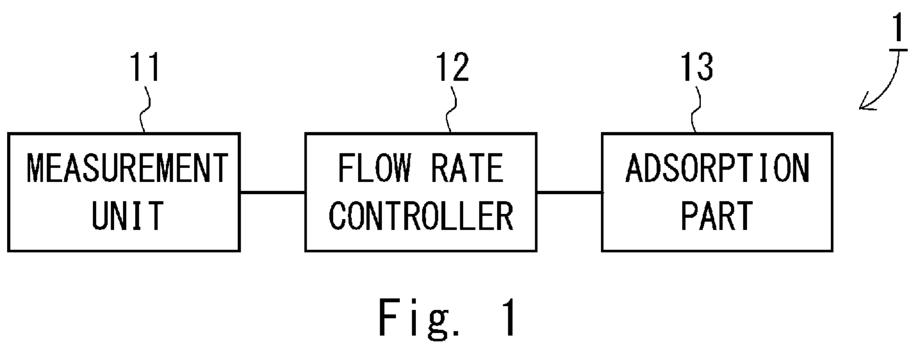
FIG. 1 is a block diagram showing a configuration of an adsorption system according to a first embodiment.

Hereinafter, with reference to the drawings, a first embodiment according to the present disclosure will be described in detail. First, a configuration of an adsorption system according to this embodiment will be described in detail. FIG. 1 is a block diagram showing a configuration of an adsorption system according to the first embodiment.

An adsorption system 1 according to the first embodiment is an adsorption system that adsorbs a predetermined gas component from a gas containing a predetermined gas component to be adsorbed and water vapor. The adsorption system 1 according to the first embodiment includes a measurement unit 11, a flow rate controller 12, and an adsorption part 13.

The adsorption system 1 may be, for example, a so-called direct air capture (DAC) system that adsorbs carbon dioxide contained in the atmosphere. The adsorption system 1 may also be, for example, an exhaust gas purification system that adsorbs nitrogen oxides, sulfur oxides, etc. contained in exhaust gas emitted from factories, automobiles, etc. Further, the adsorption system 1 may adsorb a predetermined gas component contained in the gas in order to produce, for example, a predetermined gas component of high purity.

That is, the adsorption system 1 may be used for any application as long as the adsorption system 1 has a configuration for adsorbing a predetermined gas component contained in the gas. Further, the gas to be applied to the adsorption system 1 may be any gas as long as it contains a predetermined gas component to be adsorbed and water vapor. Further, the predetermined gas component to be adsorbed by the adsorption system 1 according to the first embodiment may be any gas component as long as it is adsorbable.

The adsorption part 13 adsorbs the predetermined gas component from the gas. The adsorption part 13 has an adsorbent material which adsorbs the predetermined gas component. The adsorption part 13 causes the adsorbent material to adsorb the predetermined gas component. For example, the adsorption part 13 may include a filter with an adsorbent coated on its pore surface as the adsorbent material. The adsorption part 13 may adsorb the predetermined gas component by supplying the gas to the filter.

The adsorbent material may be suitably changed according to the predetermined gas component to be adsorbed. For example, when the predetermined gas component is an acidic compound such as carbon dioxide, nitrogen oxide, sulfur oxide, etc., the adsorbent material may be a honeycomb filter in which a carrier carrying an adsorbent such as polyethyleneimine, primary amine, secondary amine, or secondary alkanolamine is carried on the pore surface.

Here, the adsorption ability of the adsorption part 13 varies according to the flow rate of the gas. More specifically, the adsorption ability of the adsorption part 13 varies for each gas component according to the flow rate of the gas. More specifically, when the flow rate of the gas increases, the adsorption ability of the adsorption part 13 decreases more significantly for a gas component with a lower affinity to the adsorbent.

Therefore, by controlling the flow rate of the gas supplied to adsorption part 13, the adsorption ability of the adsorption part 13 to adsorb each gas component can be controlled. For example, in a case where the adsorption part 13 adsorbs carbon dioxide and water vapor, if the flow rate controller 12 increases the flow rate of the gas supplied to the adsorption part 13, the amount of carbon dioxide adsorbed in the adsorption part 13 increases and the amount of water vapor adsorbed decreases.

The measurement unit 11 measures the humidity of the gas. The measurement unit 11 outputs the measured humidity of the gas to the flow rate controller 12. More specifically, the measurement unit 11 measures the humidity of the gas before the flow rate is controlled by the flow rate controller 12 described below. Further, the measurement unit 11 may also be adapted to measure the humidity of the gas in which the predetermined gas component has never been adsorbed by the adsorption system 1. The humidity measured by the measurement unit 11 may be a relative humidity or an absolute humidity.

The flow rate controller 12 obtains the humidity of the gas from the measurement unit 11. The flow rate controller 12 controls the flow rate of the gas supplied to the adsorption part 13 based on the humidity measured by the measurement unit 11.

More specifically, the flow rate controller 12 determines the flow rate of the gas supplied to the adsorption part 13 based on the humidity measured by the measurement unit 11. The flow rate controller 12 then controls the operation of the mechanism for supplying the gas to the adsorption part 13 to achieve the determined flow rate.

The flow rate controller 12 may introduce, for example, the measured humidity into a predetermined function to determine the flow rate of the gas. Further, the flow rate controller 12 may determine the flow rate of the gas by referring to, for example, a table that records the range of humidity in association with the flow rate of the gas. Further, the flow rate controller 12 may determine the flow rate of the gas by using, for example, an artificial intelligence (AI) that outputs the flow rate of the gas using humidity as input information.

That is, the flow rate controller 12 may use any method to determine the flow rate of the gas to be supplied to the adsorption part 13 as long as the flow rate controller 12 determines the flow rate of the gas to be supplied to the adsorption part 13 based on the humidity measured by the measurement unit 11.

The flow rate controller 12 determines the flow rate in a state where the atmosphere is supplied to at least the adsorption part 13. In other words, the flow rate controller 12 determines at least the flow rate of a value greater than 0.

The flow rate controller 12 may control the flow rate of the gas supplied to the adsorption part 13 by controlling, for example, the rotation speed of a fan that supplies the gas to the adsorption part 13. The flow rate controller 12 may also control the flow rate of the gas supplied to the adsorption part 13 by controlling, for example, an amount of output of a pump that supplies the gas to the adsorption part 13.

That is, the flow rate controller 12 may use any method to control the flow rate of the gas to be supplied to the adsorption part 13 as long as the flow rate controller 12 controls the flow rate of the gas to be supplied to the adsorption part 13 to a determined flow rate. Further, the mechanism to supply the gas to the adsorption part 13 may be any mechanism as long as it is possible to supply the gas to the adsorption part 13 and change the flow rate of the gas to be supplied.

When the flow rate of the gas increases, the operation cost of the mechanism that supplies the gas to the adsorption part 13 increases accordingly. On the other hand, if the adsorption ability of the adsorption part 13 to adsorb a predetermined gas component increases as the flow rate of the gas increases, the adsorption part 13 can adsorb more predetermined gas components as the flow rate of the gas increases.

Therefore, the flow rate controller 12 may further control the flow rate of the gas based on the operation cost of the mechanism that supplies the gas to the adsorption part 13. For example, the flow rate controller 12 may determine the flow rate of the gas to be a first flow rate if the humidity measured by the measurement unit 11 is less than a predetermined threshold. If the humidity measured by the measurement unit 11 is greater than the predetermined threshold, the flow rate controller 12 may determine the flow rate of the gas to be a second flow rate, which is higher than the first flow rate. According to the aforementioned configuration, the adsorption system 1 according to this embodiment can adsorb a predetermined gas component more efficiently.

<Operation of Adsorption System>

Figure 2:
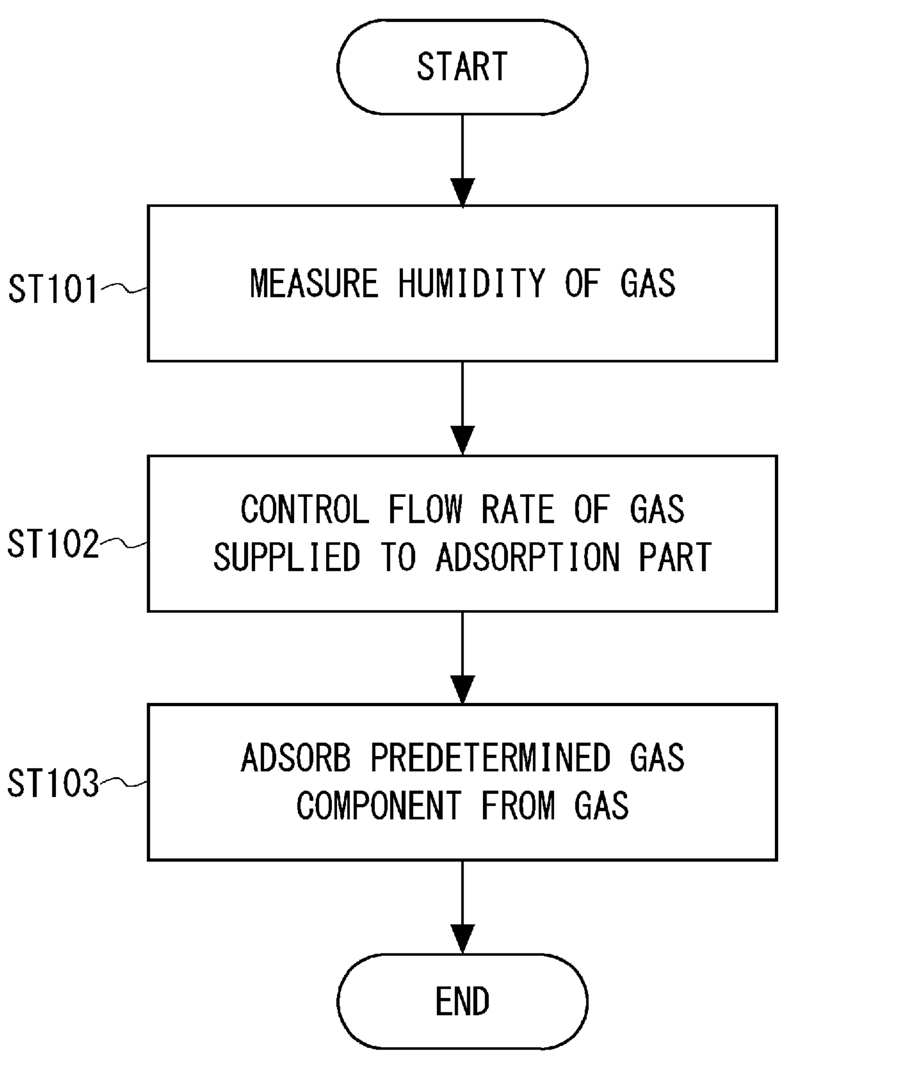
FIG. 2 is a flowchart showing an operation of the adsorption system according to the first embodiment.

Next, an operation of the adsorption system, that is, an adsorption method according to the first embodiment, will be described in detail. FIG. 2 is a flowchart showing an operation of the adsorption system according to the first embodiment.

First, the measurement unit 11 measures the humidity of the gas (Step ST101). Next, the flow rate controller 12 controls the flow rate of the gas supplied to the adsorption part 13 (Step ST102). Finally, the adsorption part 13 adsorbs a predetermined gas component from the gas, and the adsorption system 1 ends the series of operations (Step ST103).

As described above, the adsorption system according to this embodiment is an adsorption system that adsorbs a predetermined gas component from a gas containing the predetermined gas component to be adsorbed and water vapor, and controls the flow rate of the gas to be supplied to the adsorption part based on the humidity of the gas. According to the aforementioned configuration, the adsorption system according to one aspect of the present disclosure can adjust the ability to adsorb the predetermined gas component and water vapor. As a result, the adsorption system according to one aspect of the present disclosure can improve the efficiency of adsorbing the gas component.

Second Embodiment

<Configuration of Adsorption System>

Figure 3:
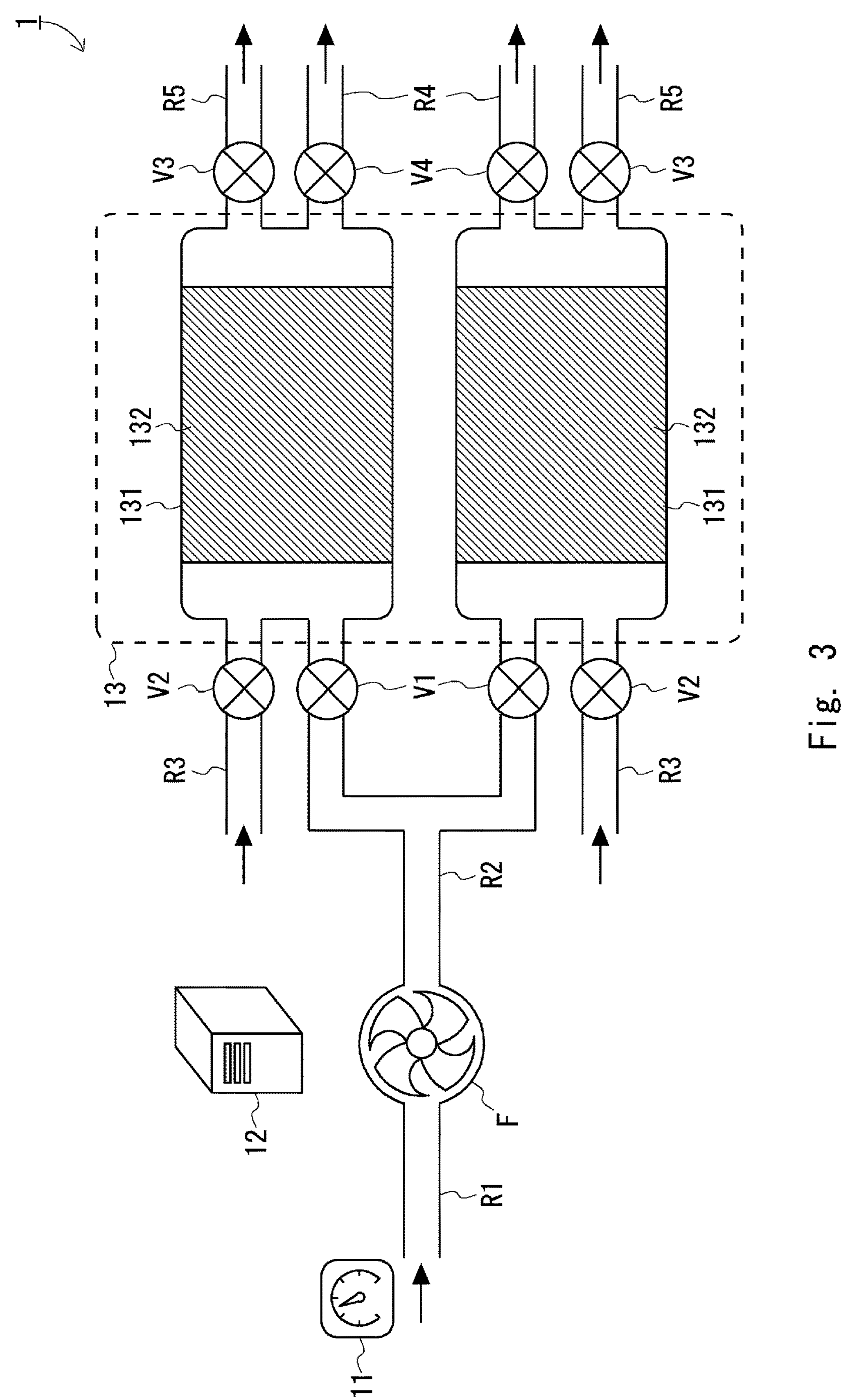
FIG. 3 is a schematic cross-sectional view showing a configuration of an adsorption system according to a second embodiment.

With reference to the drawings, a second embodiment according to the present disclosure will be described in detail below. The second embodiment is a specific example of the adsorption system according to the first embodiment. First, a configuration of the adsorption system according to this embodiment will be described in detail. FIG. 3 is a schematic cross-sectional view showing a configuration of the adsorption system according to the second embodiment.

An adsorption system 1 according to the second embodiment is a so-called direct air capture (DAC) system that adsorbs carbon dioxide contained in the atmosphere. The adsorption system 1 according to the second embodiment takes in the atmosphere by a fan F, supplies the captured atmosphere to an adsorption part 13, and adsorbs carbon dioxide from the supplied atmosphere. The adsorption system 1 according to the second embodiment includes a measurement unit 11, a flow rate controller 12, an adsorption part 13, a fan F, flow channels R1-R5, and regulating valves V1-V4.

The measurement unit 11 according to the second embodiment is a hygrometer provided near an intake port of the adsorption system 1. The measurement unit 11 outputs the measured humidity to the flow rate controller 12. The atmosphere whose humidity is measured by the measurement unit 11 is taken into the flow channel R1 by rotation of the fan F that will be described later.

The flow channel R1, which is a passage through which the atmosphere taken in by the adsorption system 1 first flows, is a so-called pipeline. An atmosphere intake port is provided at one end of the flow channel R1, and the fan F is provided at the other end of the flow channel R1. The atmosphere passing through the flow channel R1 is sent to the flow channel R2 via the fan F.

The fan F corresponds to the mechanism that supplies the gas to the adsorption part 13 according to the first embodiment. The fan F is a fan provided at the end of the flow channel R1, and generates an air flow by rotating. The air flow generated by the fan F captures the atmosphere from the intake port, and the captured atmosphere is supplied to the adsorption part 13.

The amount of rotation of the fan F is controlled by the flow rate controller 12. As the amount of rotation of the fan F increases, the flow rate of the atmosphere supplied to the adsorption part 13 increases. On the other hand, as the amount of rotation of the fan F increases, the operation cost of the fan F increases. The atmosphere passing through the fan F is sent to the flow channel R2.

The flow rate controller 12 obtains the measured humidity of the atmosphere from the measurement unit 11. The flow rate controller 12 determines the flow rate of the atmosphere supplied to the adsorption part 13 based on the obtained humidity of the atmosphere. The flow rate controller 12 controls the amount of rotation of the fan F so that the flow rate of the atmosphere supplied to the adsorption part 13 becomes the determined flow rate.

The flow rate controller 12 may be configured as a control computer for the fan F. Further, the flow rate controller 12 may be configured as a control computer for the adsorption system 1. In this case, the flow rate controller 12 may include an arithmetic unit such as a Central Processing Unit (CPU) (not shown), and a storage unit, such as a Random Access Memory (RAM) or a Read Only Memory (ROM), which store programs, data, and the like for controlling the operation of the flow rate controller 12.

The flow rate controller 12 according to this embodiment determines whether the humidity acquired from the measurement unit 11 is less than a predetermined threshold. When the acquired humidity is less than the predetermined threshold, the flow rate controller 12 determines the flow rate of the gas to be a first flow rate. When the humidity measured by the measurement unit is greater than the predetermined threshold, the flow rate controller 12 determines the flow rate of the gas to be a second flow rate higher than the first flow rate. That is, the flow rate controller 12 decreases the flow rate of the atmosphere when the amount of water vapor contained in the atmosphere is small, and increases the flow rate of the atmosphere when the amount of water vapor contained in the atmosphere is large.

When the amount of water vapor contained in the atmosphere is large, the adsorption part 13 tends to adsorb water vapor and, accordingly, it becomes difficult for the adsorption part 13 to adsorb carbon dioxide. Therefore, when the amount of water vapor contained in the atmosphere is large, the flow rate controller 12 increases the adsorption ability of the adsorption part 13 to adsorb carbon dioxide by increasing the flow rate of the atmosphere. With the aforementioned configuration, the adsorption system 1 according to this embodiment can efficiently adsorb carbon dioxide even when the amount of water vapor contained in the atmosphere is large.

On the other hand, when the amount of water vapor contained in the atmosphere is small, it becomes difficult for the adsorption part 13 to adsorb water vapor, so carbon dioxide can be efficiently adsorbed even when the flow rate of the atmosphere is low. Therefore, when the amount of water vapor contained in the atmosphere is small, the flow rate controller 12 lowers the flow rate of the atmosphere to reduce the operation cost of the fan F. With the aforementioned configuration, the adsorption system 1 according to this embodiment can reduce the cost for adsorbing carbon dioxide.

The adsorption part 13 is supplied with the atmosphere through the flow channel R2. More specifically, the adsorption part 13 is supplied with the atmosphere through the flow channel R2 with the flow rate controlled by the flow rate controller 12. The adsorption part 13 adsorbs carbon dioxide contained in the supplied atmosphere. The configuration of the adsorption part 13 will be described in more detail below.

The adsorption part 13 according to this embodiment includes two adsorption tanks 131, each having an adsorption layer 132 that adsorbs carbon dioxide. The adsorption part 13 performs the process for adsorbing carbon dioxide using one adsorption tank 131. The adsorption part 13 performs a process for desorbing carbon dioxide adsorbed on the other adsorption tank while one adsorption tank 131 is adsorbing carbon dioxide.

When the process for adsorbing carbon dioxide performed on one adsorption tank 131 and the process for desorbing carbon dioxide performed on the other adsorption tank are completed, the adsorption part 13 performs the processes for adsorbing and desorbing carbon dioxide again by replacing the roles of these two adsorption tanks 131.

The adsorption tank 131 has the adsorption layer 132 therein. The adsorption tank 131 is connected to the flow channels R2-R5 via respective regulating valves V1-V4. When the carbon dioxide adsorption process is performed, the adsorption tank 131 is supplied with the atmosphere via the flow channel R2. More specifically, the adsorption tank 131 is supplied with the atmosphere from the flow channel R2 with the flow rate controlled by the flow rate controller 12.

The adsorption tank 131 then discharges the atmosphere from which carbon dioxide has been removed out of the adsorption system 1 via the flow channel R4. The adsorption tank 131 may release the atmosphere from which carbon dioxide has been adsorbed and removed outdoors, for example.

When the carbon dioxide desorption process is performed, the adsorption tank 131 is supplied with the desorption gas via the flow channel R3. The adsorption tank 131 then discharges the carbon dioxide desorbed by the desorption gas out of the adsorption system 1 via the flow channel R5. The adsorption tank 131 may discharge the desorbed carbon dioxide into, for example, a storage container.

The adsorption layer 132 is a layer provided inside the adsorption tank 131 to adsorb carbon dioxide. The adsorption layer 132 according to this embodiment is a honeycomb filter coated with polyethyleneimine-loaded silica.

The flow channel R2, which is a flow channel through which the atmosphere flows with the flow rate controlled by the flow rate controller 12, is connected to the adsorption tank 131 through the regulating valve V1. The flow channel R2 has a branching structure to be connected to the two adsorption tanks 131.

The regulating valve V1 connects the flow channel R2 to the adsorption tank 131. The regulating valve V1 can block the atmosphere to be supplied from the flow channel R2 to the adsorption tank 131. The regulating valve V1 does not block the atmosphere to be supplied to the adsorption tank 131 when the adsorption tank 131 is performing the adsorption process. On the other hand, the regulating valve V1 blocks the atmosphere to be supplied to the adsorption tank 131 when the adsorption tank 131 is performing the desorption process.

The flow channel R4 is a flow channel through which the atmosphere in which carbon dioxide is adsorbed and removed by the adsorption layer 132 flows. The atmosphere flowing through the flow channel R4 is discharged out of the adsorption system 1. The flow channel R4 is connected to the adsorption tank 131 through the regulating valve V4.

The regulating valve V4 connects the flow channel R4 to the adsorption tank 131. The regulating valve V4 can block the gas to be released outside the adsorption system 1 via the flow channel R4.

The regulating valve V4 does not block the gas to be released outside the adsorption system 1 when the adsorption tank 131 is performing the adsorption process. On the other hand, the regulating valve V4 blocks the gas to be released outside the adsorption system 1 when the adsorption tank 131 is performing the desorption process.

The flow channel R3 is a flow channel through which the desorption gas to be supplied to the adsorption tank flows. The flow channel R3 is connected to the adsorption tank 131 through the regulating valve V2. The regulating valve V2 connects the flow channel R3 to the adsorption tank 131. The regulating valve V2 can block the desorption gas to be supplied to the adsorption tank 131 via the flow channel R3.

The regulating valve V2 blocks the desorption gas to be supplied to the adsorption tank 131 when the adsorption tank 131 is performing the adsorption process. On the other hand, the regulating valve V2 does not block the desorption gas to be supplied to the adsorption tank 131 when the adsorption tank 131 is performing the desorption process.

The flow channel R5 is a flow channel through which carbon dioxide desorbed from the adsorption layer 132 flows. The carbon dioxide desorbed from the adsorption layer 132 is released outside the adsorption system 1 via the flow channel R5. The flow channel R5 is connected to the adsorption tank 131 via the regulating valve V3. The regulating valve V3 connects the flow channel R5 to the adsorption tank 131. The regulating valve V3 can block carbon dioxide to be released outside the adsorption system 1 via the flow channel R5.

The regulating valve V3 blocks carbon dioxide to be released outside the adsorption system 1 when the adsorption tank 131 is performing the adsorption process. On the other hand, the regulating valve V3 does not block carbon dioxide to be released outside the adsorption system 1 when the adsorption tank 131 is performing the desorption process.

<Operation of Adsorption System>

Figure 4:
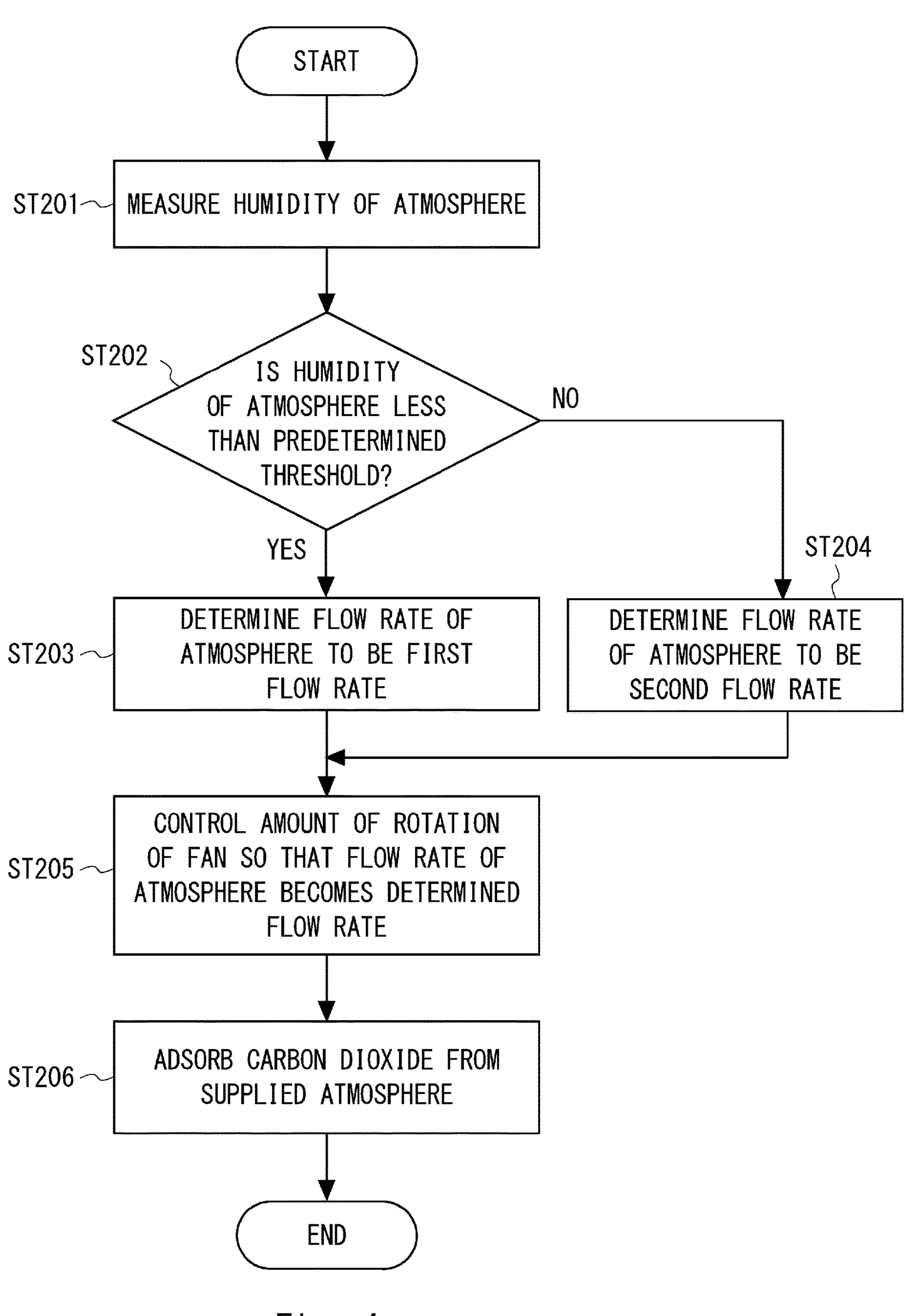
FIG. 4 is a flowchart showing an operation of the adsorption system according to the second embodiment.

Next, an operation of the adsorption system according to the second embodiment, that is, an adsorption method according to the second embodiment, will be described in detail. FIG. 4 is a flowchart showing an operation of the adsorption system in the second embodiment.

First, the measurement unit 11 measures the humidity of the atmosphere (Step ST201). More specifically, the measurement unit 11 measures the humidity of the atmosphere taken from the intake port. Then the flow rate controller 12 determines whether the humidity of the atmosphere is less than a predetermined threshold (Step ST202).

When the humidity of the atmosphere is less than the predetermined threshold (YES in Step ST202), the flow rate controller 12 determines the flow rate of the atmosphere to be a first flow rate (Step ST203). When the humidity of the atmosphere is greater than the predetermined threshold (NO in Step ST202), the flow rate controller 12 determines the flow rate of the atmosphere to be a second flow rate (Step ST204). However, the second flow rate is higher than the first flow rate.

That is, Step ST202 to Step ST204 are steps in which the flow rate controller 12 determines the flow rate of the atmosphere to be a low flow rate when the humidity of the atmosphere is less than the predetermined threshold, and determines the flow rate of the atmosphere to be a high flow rate when the humidity of the atmosphere is greater than the predetermined threshold.

Next, the flow rate controller 12 controls the amount of rotation of the fan so that the flow rate of the atmosphere becomes the determined flow rate (Step ST205). Finally, the adsorption part 13 adsorbs carbon dioxide from the supplied atmosphere (Step ST206), and the adsorption system 1 ends the series of operations. More specifically, the adsorption part 13 adsorbs carbon dioxide from the atmosphere with the flow rate controlled, and the adsorption system 1 ends the series of operations.

As described above, the adsorption system 1 according to this embodiment is a direct air capture (DAC) system that adsorbs carbon dioxide contained in the atmosphere. The adsorption system 1 according to this embodiment supplies the atmosphere to the adsorption part at a high flow rate when the humidity of the atmosphere is greater than the predetermined threshold, and supplies the atmosphere to the adsorption part at a low flow rate when the humidity of the atmosphere is less than the predetermined threshold.

According to the aforementioned configuration, the adsorption system 1 can improve the ability to adsorb carbon dioxide when the humidity of the atmosphere is greater than the predetermined threshold, that is, when the adsorption system 1 does not easily adsorb carbon dioxide. Further, according to the aforementioned configuration, the adsorption system 1 can reduce the cost for adsorbing carbon dioxide when the humidity of the atmosphere is less than the predetermined threshold, that is, when the adsorption system 1 tends to adsorb carbon dioxide. As a result, the adsorption system 1 according to this embodiment can improve the efficiency of adsorbing carbon dioxide.

EXAMPLES

The present disclosure will be more specifically described below based on Examples and comparative examples, but the present disclosure is not limited to these Examples.

<Preparation of Adsorption Layer>

A coating liquid obtained by mixing silica (average particle: 10 μm) manufactured by Fuji Silysia Chemical Ltd. with a binder was coated on a cordierite material that uses a honeycomb (q: 8 mm×50 mm) manufactured by NGK Insulators, Ltd., and dried. Polyethyleneimine (average molecular weight: 600) manufactured by FUJIFILM Wako Pure Chemical Corporation was diluted with ethanol so as to make a concentration of 30 mass %, and thus an amine solution was prepared. The substrate coated with the coating solution was impregnated in the amine solution overnight, and the substrate was dried under reduced pressure to prepare an adsorption layer.

<Adsorption Tests>

Example 1

The atmosphere with a wind speed of 1.7 m/s, 25° C., and 90% of relative humidity was sprayed on the prepared adsorption layer to adsorb carbon dioxide and water vapor. Then, the adsorption layer was heated to 100° C. and nitrogen gas was blown to desorb the adsorbed carbon dioxide and water vapor. Then, the amounts of the desorbed carbon dioxide and water vapor were measured. Based on the measured amounts of carbon dioxide and water vapor, the carbon dioxide recovery energy and the molar ratio of the adsorbed carbon dioxide molecules and water molecules were calculated.

Comparative Example 1

The atmosphere with a wind speed of 1.0 m/s, 25° C., and 90% of relative humidity was sprayed on the prepared adsorption layer to adsorb carbon dioxide and water vapor. Then, the adsorption layer was heated to 100° C. and nitrogen gas was blown to desorb the adsorbed carbon dioxide and water vapor. Then, the amounts of the desorbed carbon dioxide and water vapor were measured. Based on the measured amounts of carbon dioxide and water vapor, the carbon dioxide recovery energy and the molar ratio of adsorbed carbon dioxide molecules and water molecules were calculated.

Test Results

Table 1 shows results of the adsorption tests. The amounts of carbon dioxide and water vapor measured are expressed as the number of moles of silica and polyethyleneimine adsorbed per gram. Further, the carbon dioxide recovery energy is expressed as an energy required to recover 1 ton of carbon dioxide.

TABLE 1

| | Carbon dioxide adsorbed amount (Unit: mol/g) | Water Vapor adsorbed amount (Unit: mol/g) | Molar ratio ($H_2O$/ $CO_2$) | Carbon dioxide recovery energy (Unit: GJ/T) |
|---|---|---|---|---|
| Example 1 | 0.00103 | 0.00188 | 1.83 | 6.9 |
| Comparative Example 1 | 0.000916 | 0.00239 | 2.61 | 7.2 |

According to Table 1, the adsorption layer in Example has a higher amount of carbon dioxide adsorbed and a lower amount of water vapor adsorbed than the adsorption layer in the comparative example does. That is, Table 1 shows that the adsorption ability of the adsorption layer to adsorb each gas can be controlled by controlling the flow rate of the atmosphere.

Further, according to Table 1, the adsorption layer in Example requires less energy to adsorb a unit amount of carbon dioxide than the adsorption layer in the comparative example does. In other words, Table 1 shows that the adsorption layer in Example can recover carbon dioxide more efficiently than the adsorption layer in the comparative example does.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An adsorption system that adsorbs carbon dioxide, from an atmosphere containing carbon dioxide and water vapor, the adsorption system comprising:

an adsorption part configured to adsorb carbon dioxide from the atmosphere by using polyethyleneimine as an adsorbent;

a measurement unit configured to measure humidity of the atmosphere; and a flow rate controller configured to control a flow rate of the atmosphere supplied to the adsorption part based on the humidity measured by the measurement unit, wherein when the humidity measured by the measurement unit is less than a predetermined threshold, the flow rate controller controls the flow rate of the atmosphere to be a first flow rate, and when the humidity measured by the measurement unit is larger than the predetermined threshold, the flow rate controller controls the flow rate of the atmosphere to be a second flow rate which is larger than the first flow rate.

2. An adsorption method for adsorbing carbon dioxide from an atmosphere containing carbon dioxide and water vapor, the adsorption method comprising:

measuring humidity of the atmosphere; and controlling a flow rate of the atmosphere supplied to an adsorption part based on the measured humidity, the adsorption part adsorbing carbon dioxide from the atmosphere by using polyethyleneimine as an adsorbent, wherein when the measured humidity is less than a predetermined threshold, the flow rate of the atmosphere is controlled to be a first flow rate, and when the measured humidity is larger than the predetermined threshold, the flow rate of the atmosphere is controlled to be a second flow rate which is larger than the first flow rate.

* * * * *